United States Patent

[11] 3,613,725

| [72] | Inventor | George C. Hughes<br>Anderson, Ind. |
|---|---|---|
| [21] | Appl. No. | 1,701 |
| [22] | Filed | Jan. 9, 1970 |
| [45] | Patented | Oct. 19, 1971 |
| [73] | Assignee | Textron Inc.<br>Providence, R.I. |

[54] SAFETY CONTROL FOR FLUID PRESSURE REGULATORS
9 Claims, 6 Drawing Figs.

[52] U.S. Cl. .................................................. 137/613,
251/333, 137/512.3, 137/516.25
[51] Int. Cl. .................................................. F16k 15/02,
F16k 25/00
[50] Field of Search .................................... 137/613,
516.25, 516.27, 614.18, 512, 512.3, 513; 251/332,
333, 334, 212

[56] References Cited
UNITED STATES PATENTS

| 931,532 | 8/1909 | Wainwright .................. | 137/516.27 |
| 2,524,129 | 10/1950 | Klein ............................ | 137/516.25 |
| 3,033,230 | 5/1962 | Brand .......................... | 137/512 |
| 3,465,786 | 9/1969 | Spisak ......................... | 137/516.27 |

*Primary Examiner*—Laverne D. Geiger
*Assistant Examiner*—William H. Wright
*Attorney*—Johnson & Kline

ABSTRACT: A safety control for fluid pressure regulators having means for restricting high-pressure fluid from flowing downstream in the event that foreign matter or structural defects in the orifice or valve seat of the valve means prevents the valve from completely sealing off the flow of fluid or locking up under the action of the regulator. Such a safety control will prevent and eliminate the need to discharge into the surrounding air a large volume of fluid, such as gas, through the usual vent in the regulator.

INVENTOR.
George C. Hughes
BY
Johnson and Kline
ATTORNEYS

INVENTOR.
George C. Hughes
BY
Johnson and Kline
ATTORNEYS

SAFETY CONTROL FOR FLUID PRESSURE REGULATORS

Heretofore foreign matter in the gas or structural failure or defects in the valve means would prevent the valve seat from completely closing or locking up. Fluid would continue to flow through the valve, for example, if it was held open by the foreign matter, and cause a large volume of fluid to pass through the valve. This resulted in an overpressure in the regulator so that a large amount of fluid or gas would be discharged through the vent in the regulator which may cause a serious hazard in certain installation areas.

The present invention overcomes this difficulty by providing a novel construction in the valve means including an orifice and a valve seat, one of which is resiliently mounted so that the valve means, should foreign matter or other failure of the valve means prevent the valve from closing, would tend to restrict the flow of high-pressure gas and thus reduce the pressure in the downstream line and also prevent the buildup of pressure in the regulator to cause large volumes of gas to be discharged through the usual regulator vent.

This is accomplished in one form of the invention by a novel valving construction in which a sleeve is slidable in the valve port and is normally resiliently urged by a spring to a projecting position in which it is engaged by the valve seat. In the event that there is a valve failure or that foreign matter comes between the valve seat and the end of the sleeve so as to prevent the valve from being closed with the result that the fluid can flow through the valve into the regulator and downstream at high pressure, the overpressure on the regulator will cause the valve seat to press against the sleeve to move it inwardly and compress the spring so that the coils thereof form a means for restricting or substantially closing the passage to the flow of gas. Should any small amounts of gas pass the compressed spring, they can be safely vented by the regulator without serious dangerous conditions being present.

In another form of the invention the sliding, normally projecting sleeve has a rearwardly extended portion which engages the housing in response to movement of the sleeve by the valve seat and closes off the flow prior to the full compression of the spring and thus seals the valve against further passage of fluid.

In a still further form of the invention a sleeve is secured to the housing to provide a fixed orifice and the valve seat resiliently mounted on the valve stem to yield under overpressure in the regulator to move a control member on the stem into flow restricting contact with a member carried by the fixed sleeve forming the orifice.

Other features and advantages of the invention will be apparent from the specification and claims when considered in connection with the accompanying drawings in which:

Figure 1:
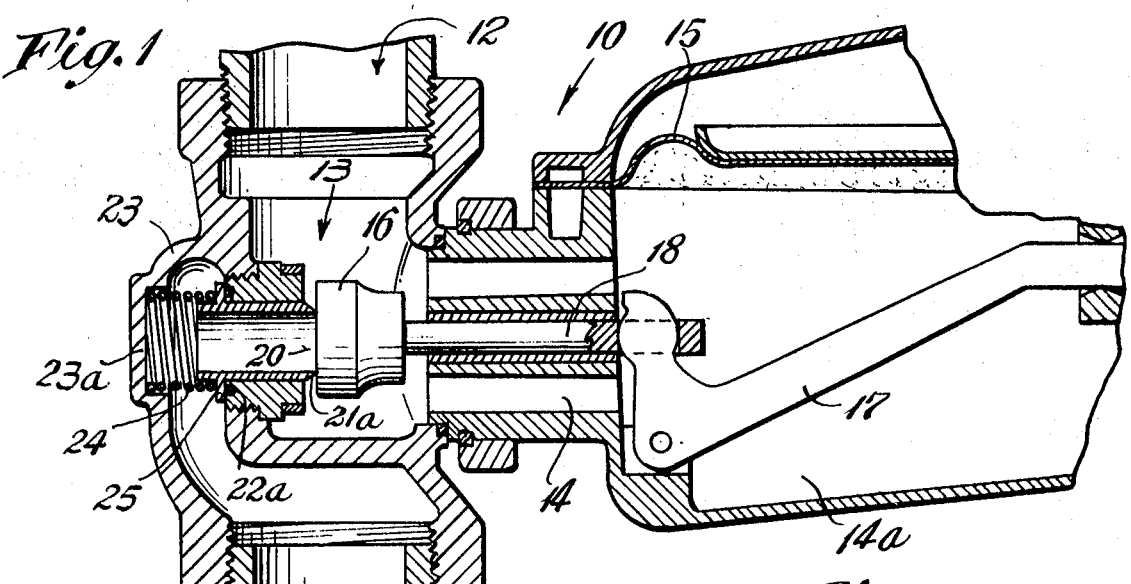
FIG. 1 shows a sectional view of the valve portion of the regulator in normal closed position.

As shown in the drawings the regulator 10 has an inlet 11, outlet 12, and a valve means 13 for controlling the flow of gas between the inlet and outlet also has a passage 14 communicating with the outlet passage with a regulator pressure chamber 14a which is closed by the usual flexible pressure-responsive diaphragm 15 and in which a valve seat 16 is actuated by a bellcrank 17 operating on a valve stem 18 for moving the valve seat 16 into a closed or sealing position with the orifice 20 as shown in FIG. 1 in response to the pressure in the pressure chamber in the regulator.

For the purpose of illustrating the present invention, the failure of the valve means will be described as occurring because of the presence of particles of foreign matter between the valve seat and orifice. As shown in the drawings, the valve means 13 includes a sleeve 21 slidable in the bushing 22 carried by the regulator housing 23. The end of the sleeve has a chisel surface 21a forming the orifice 20. The sleeve is normally urged by a coiled spring 24 to a projecting position shown in FIG. 1 in which a flange 25 engages the O-ring 22a to seal the sleeve and bushing. When the spring which is disposed between the flange 25 and housing portion 23a is in normal position as shown in FIG. 1, the coils are spaced apart a sufficient distance so as not to restrict the flow of fluid through the valve means.

Figure 2:
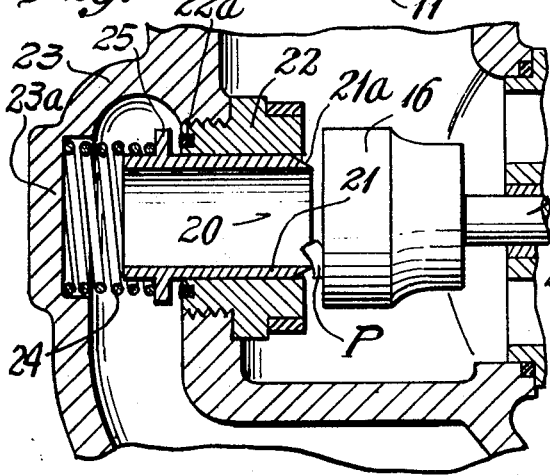
FIG. 2 is a slightly enlarged view of the valve section of FIG. 1 showing a particle of foreign matter between the valve seat and the end of the sleeve with the spring partially compressed.
Figure 3:
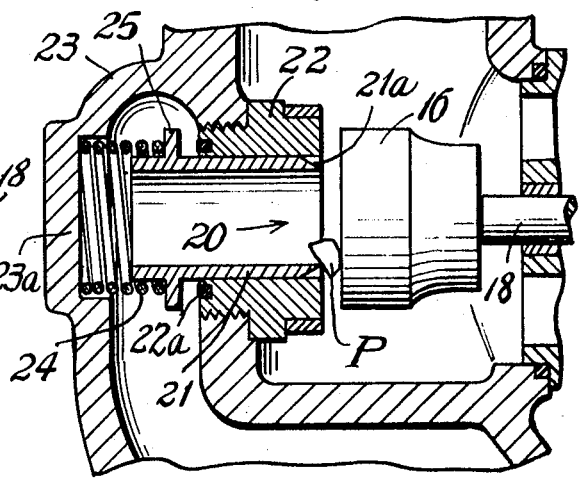
FIG. 3 shows the spring substantially compressed, thus restricting flow of the fluid through the valve.

When the valve seat is in the position of FIG. 1, it seals the end of the sleeve 21 closing the orifice and the flow of fluid is stopped and the valve means is in its sealed or locked up position. However, should a particle P (greatly enlarged) of foreign matter be disposed between the valve seat 16 and the end 21a of the sleeve 21 which projects beyond the bushing, it will prevent closing of the valve means, as shown in FIG. 2. Continued pressure by the valve seat on the sleeve, as caused by the diaphragm 15 and bellcrank 17, will overcome the pressure of the spring and cause it to be compressed progressively as shown in FIGS. 2 and 3 so that the coils of the spring will finally substantially close off the passage and restrict the flow of high-pressure gas through the valve means. Such a condition is shown in FIG. 3.

It will be seen, therefore, that the novel safety control has a valving structure that will stop or greatly reduce the flow of gas so that any slight leakage can be discharged through the vent of the regulator without any serious danger.

Figure 4:
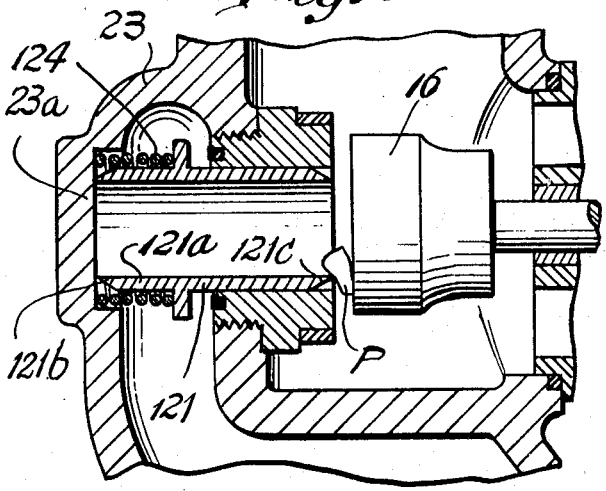
FIG. 4 is a view similar to FIG. 3 of another form of the invention.

In the form of the invention shown in FIG. 4, the sleeve 121, which is urged to projected position by spring 124, has a rearwardly extending section 121a. This section, when the sleeve is moved rearwardly by the valve seat, will cause the end of the extension 121a to engage the portion 23a of the housing 23 and restrict or substantially shut off the flow of fluid.

It will be noted that the ends of the sleeve are provided with chisel surfaces 121b, 121c so that they can provide a better sealing surface with the valve seat or with the housing to prevent flow of fluid.

Figure 5:
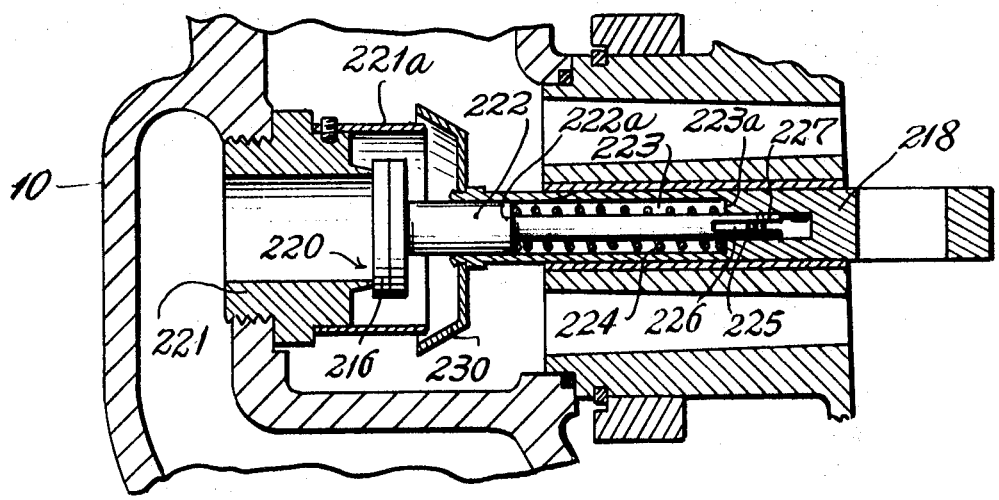
FIGS. 5 and 6 are enlarged sectional views of still another form of the invention.
Figure 6:
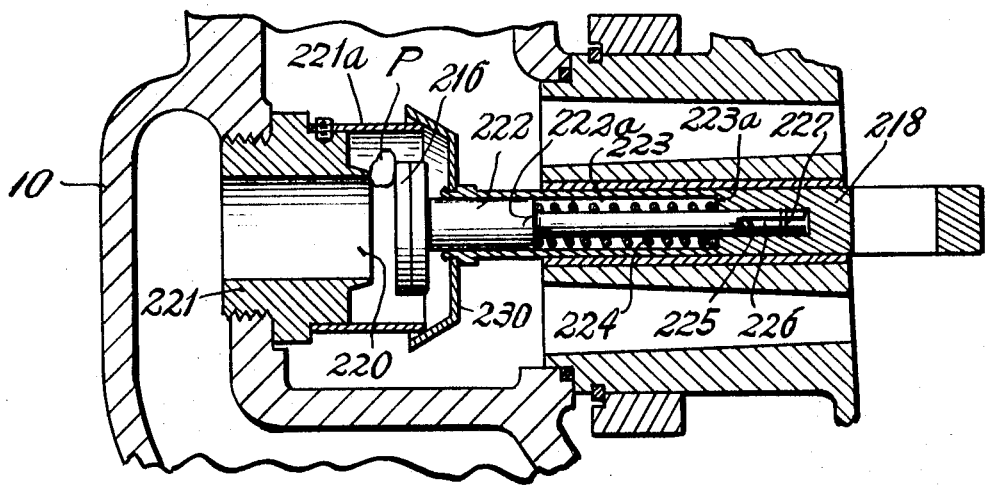

In the form of the invention shown in FIGS. 5 and 6, the valve means of the present safety control includes a sleeve 221 forming the orifice 220, which sleeve is fixed to the housing 10 to cooperate with a valve seat 216 on the valve stem 218 to control the flow of fluid or gas through the valve in response to pressure in the regulator as indicated above. In accordance with this form of the invention the valve seat 216 is slidably mounted on the valve stem 218 by means of a rod 222 connected to the valve seat and slidably mounted in a bore 223 in the valve stem. It is normally urged to a projected position, as shown in FIG. 5, by means of a spring 224 disposed in the bore with one end engaging the end 223a of the bore and the other end engaging a shoulder 222a on the rod. The rod is connected to the valve stem by a pin 225 and slot 226 connection to permit relative movement of the rod with respect to the stem and the rod has a transverse pin 227 extending across the slot 226 to form a stop for controlling the projection thereof on the stem. In its normally projected position, as shown in FIG. 5, it engages the orifice, as shown in FIG. 5, to control the flow of fluid therethrough in response to movement of the valve stem. The safety control means in this form of the invention comprises a cylindrical extension 221a carried by the valve sleeve and projecting beyond the normal position in which the valve stem engages the orifice to seal the valve means. The valve stem 218 has a dish-shaped member 230 on the end thereof and located in such a manner with respect to the end of the cylindrical extension 221a that it does not engage the extension in normal operation of the valve means. Should the valve seat fail to seal the orifice as may be caused by damaged sealing surfaces or, as illustrated, by the position of a bit P of foreign material becoming disposed between the valve seat and orifice, such as shown in FIG. 6, the continued movement of the valve stem by the overpressure in the regulator will cause the valve seat to move inwardly with respect to the stem and compress the spring 224. This will permit the end of the stem to move outwardly with respect to the orifice and will cause the dish-shaped member 230 carried by the end of the valve stem to engage the end of the extension 221a and restrict the flow of fluid, thus reducing the pressure in the regulator and in the downstream line.

Variations and modifications may be made within the scope of the claims and portions of the improvements may be used without others.

I claim:

1. A safety control for fluid pressure regulators having a housing, an inlet and outlet for a fluid, a pressure-responsive diaphragm on the housing and valving means responsive thereto for controlling the flow of fluid between said inlet and outlet, the improvement wherein said valving means comprises a sleeve mounted on the housing and having an end forming an orifice, a valve seat mounted on a movable valve stem engaging the end of the sleeve to close said orifice in response to a predetermined pressure of fluid in the regulator, said sleeve being mounted by resilient means whereby increased pressure in said regulator due to failure of said valve seat to shut off the orifice causing the resilient means to be compressed to cause a flow controlling means operated by said sleeve to close and restrict the flow of fluid resulting in the reduction of the pressure in the regulator.

2. A safety control for fluid pressure regulators having a housing, an inlet and outlet for a fluid, a pressure-responsive diaphragm on the housing and valving means responsive thereto for controlling the flow of fluid between said inlet and outlet, the improvement wherein said valving means comprises a sleeve having an end forming a movable orifice, said sleeve being slidably mounted on the housing and normally urged to a projecting position by resilient means, a valve seat for engaging the projecting end of the sleeve to close said orifice in response to a predetermined pressure of fluid in the regulator, increased pressure in said regulator above said predetermined pressure due to failure of said valve seat to shut off the orifice causing the valve seat to move the movable sleeve against the resilient means, and means operable in response to movement of the sleeve to cause a restriction in the flow of fluid and the reduction of the pressure in the regulator and provide a safe condition.

3. The invention as defined in claim 2 wherein said valve seat fails to shut off the flow of fluid when particles of foreign matter are disposed between the valve seat and orifice.

4. The invention as defined in claim 2 wherein the resilient means comprises a coil spring, the spacing of the coils normally permitting free flow of fluid with the spacing of the coils being closed by the movement of the sleeve by the valve seat and restricting the flow fluid through the valve means.

5. The invention as defined in claim 2 wherein the opposite end of said sleeve has a portion to engage the housing to seal the orifice when said sleeve is moved by the valve seat.

6. The invention as defined in claim 2 wherein the sleeve has a flange limiting the projection thereof.

7. The invention as defined in claim 6 wherein the housing has a guide bushing secured thereto to slidably support said sleeve.

8. The invention as defined in claim 7 wherein the bushing has a seal engaging said flange in projected position of said sleeve.

9. The invention as defined in claim 1 wherein the sleeve is fixed and has a cylindrical extension, said valve seat is mounted by spring means on said valve stem, and said valve stem has a dish-shaped control member movable into engagement with the end of said extension when the spring means is compressed in response to over pressure on said regulator.